United States Patent [19]

Jones

[11] Patent Number: 4,894,911

[45] Date of Patent: Jan. 23, 1990

[54] METHOD AND APPARATUS FOR LOADING ELECTRICAL CONTACTS INTO A CONNECTOR BODY

[75] Inventor: Gerald M. Jones, Titusville, Pa.

[73] Assignee: GTE Products Corporation, Stamford, Conn.

[21] Appl. No.: 308,066

[22] Filed: Feb. 9, 1989

[51] Int. Cl.[4] .......................... H01R 9/24; B23P 19/00

[52] U.S. Cl. .......................................... 29/842; 29/739; 29/645

[58] Field of Search ............... 29/739, 842, 845, 564.1

[56] References Cited

U.S. PATENT DOCUMENTS

| | | | |
|---|---|---|---|
| 3,769,679 | 11/1973 | Kendall | 29/739 X |
| 4,467,523 | 8/1984 | Chisholm | 29/845 |
| 4,598,471 | 7/1986 | Elsbree, Jr. et al. | 29/845 |
| 4,672,735 | 6/1987 | Tamano et al. | 29/845 X |
| 4,763,412 | 8/1988 | Basavanhally et al. | 29/845 |

FOREIGN PATENT DOCUMENTS

| | | | |
|---|---|---|---|
| 53-141493 | 12/1978 | Japan | 29/842 |

*Primary Examiner*—Carl J. Arbes
*Attorney, Agent, or Firm*—William H. McNeill

[57] ABSTRACT

A contact loader for electrical connectors comprises a first work station where a plurality of contacts is inserted into a clamp and the clamp is subsequently moved to a second work station where the contacts are deposited in a connector block.

2 Claims, 2 Drawing Sheets

METHOD AND APPARATUS FOR LOADING ELECTRICAL CONTACTS INTO A CONNECTOR BODY

TECHNICAL FIELD

This invention relates generally to electrical connectors and more particularly to a method and apparatus for making such connectors.

BACKGROUND ART

Electrical connectors generally comprise an insulative body containing electrically conductive contacts. When the body contains a large plurality of contacts, it is desirable to load many contacts at once, thus reducing the cost of the connector. In the past it has been difficult to accomplish this task in a simple, economic, and reliable manner.

DISCLOSURE OF THE INVENTION

It is, therefore, an object of the invention to obviate the disadvantages of the prior art.

It is another object of the invention to enhance the manufacture of electrical connectors.

These objects are accomplished, in one aspect of the invention, by the provision of an apparatus for simultaneously loading a plurality of electrical contacts into a connector body. The apparatus comprises a supply of the electrical contacts and means for delivering a linear array of the contacts from the supply to a first work station. Clamping means are provided at the first work station for engaging the linear array of contacts, transfer means also are provided for transferring the clamped linear array of contacts to a second work station located at a transverse distance from the first work station. Connector body holding means are provided at the second work station, the connector body containing a plurality of apertures to receive the contacts. Means for inserting the electrical contacts into the apertures are positioned at the second work station.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Figure 1:
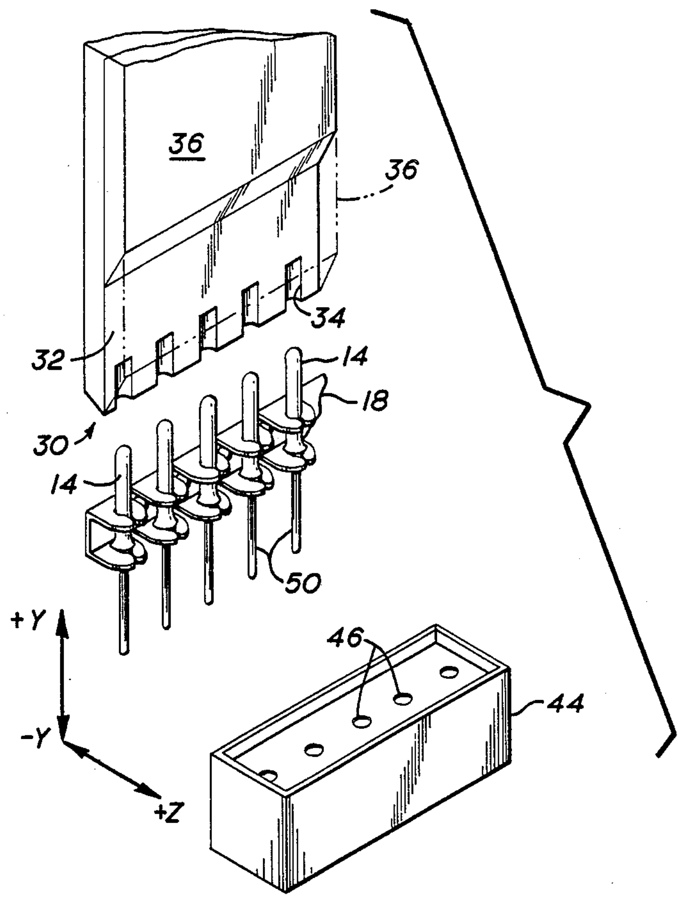
FIG. 1 is a perspective view of a portion of the apparatus.
Figure 2:
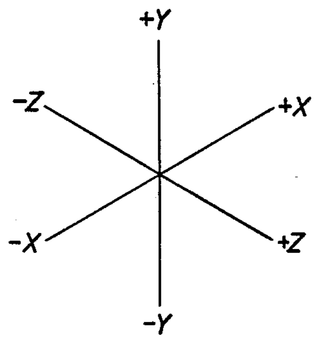
FIG. 2 is a diagrammatic representation of the directions used herein.
Figure 4:
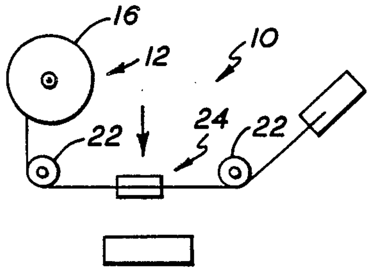
FIG. 4 is a diagrammatic plan view of the apparatus.
Figure 5:
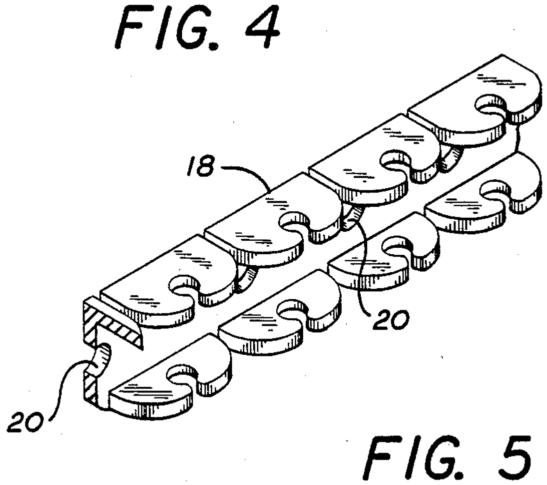
FIG. 5 is a perspective view of a bandolier strip with the contacts removed.

Referring now to the drawings with greater particularity there is shown in FIG. 4, with many parts omitted for clarity, a contact loading apparatus 10 which has a supply 12 of contacts 14 (FIG. 1). The supply 12 is preferably a spool 16 of bandoliered contacts 14 carried by strip 18 (FIG. 5) which is provided with indexing holes 20 for engaging teeth on sprockets 22. The contacts 14 are delivered to a first work station 24 whereat they are clamped and transferred to a second work station 26 where they are deposited in a connector body. The contacts 14 are delivered, by suitable means, via the bandolier strip 18, in a linear array to the first work station 24. The linear array of contacts, in vertical orientation, can be any number, although five are shown for illustrative purposes only.

Figure 3:
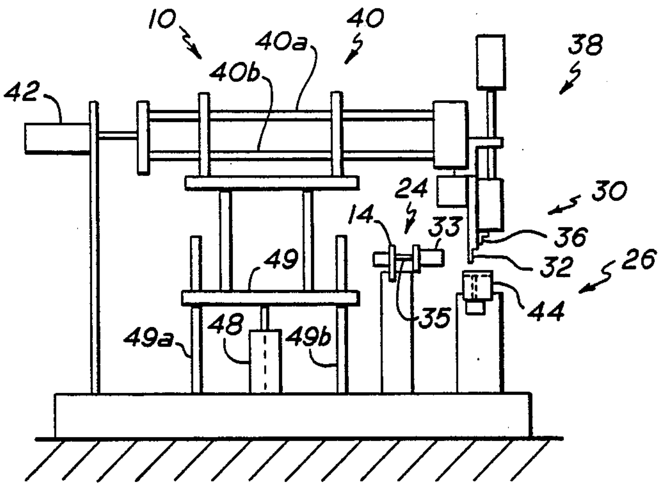
FIG. 3 is a side elevational view of the apparatus.

At the first work station 24 a clamp 30 is actuated. The clamp 30 comprises a back plane 32 grooved at 34 to receive the tops of individual contacts 14. A sliding plate 36 actuated by fluid motor 38 (See FIG. 3) covers the contact heads and completes the clamping action. Thereafter, a fluid motor 33 pushes a notched plate 35 against the bandolier 18 to remove it from the contacts 14.

The clamp 30 and its associated slide 40 are then indexed upwardly, in the +Y direction, by the action of fluid motor 48 via table 49 and slide posts **49*a*, 49*b* (two other posts not being shown) to clear the contacts 14 from the bandolier remover. The entire clamp 30 is then carried by the indexable, four rod slide 40, only two rods, 40*a* and 40*b* being shown, which is energized to move in the z direction by, for example, fluid motor 42, to transfer the clamped array to second work station 26**.

A connector body 44 of suitable insulating material and having a number of contact receiving apertures 46 therein, is provided at the second work station. Fluid motor 48 is then activated, drawing slide 40 and its attached clamp 30 downward in the −Y direction, to feed tails 50 of contacts 14 into apertures 46.

Thereafter, clamp 30 is opened, slide 40 is raised by the action of fluid motor 48; fluid motor 42 retracts slide 40 and clamp 30 back to the first work station 24 and fluid motor 48 repositions clamp 30 to begin another cycle.

Connector body 44 can then be removed or indexed to another position for further processing.

While the illustrated embodiment relies on fluid motors for all movement, it is to be understood that various other motor means can be employed. For example, the motor means for causing the Y and Z axis movement can be a ground ball screw and stepping motor combination.

Accordingly, while there have been shown what are at present considered to be the preferred embodiments of the invention, it will be apparent to those skilled in the art that various changes and modifications can be made herein without departing from the scope of the invention as defined by the appended claims.

I claim:

1. Apparatus for simultaneously loading a plurality of electrical contacts into a connector body comprising; a supply means for said electrical contacts; means for delivering a linear array of said contacts from said supply to a first work station; clamping means at said first work station for engaging said linear array of said contacts; transfer means for transferring said clamped linear array of contacts to a second work station located at a transverse distance from said first work station, said transfer means including first motor means for moving said clamping means in a Y direction and second motor means for moving said transfer means in a Z direction; means for providing a connector body at said second work station, said connector body containing a plurality of apertures to receive said contacts; and means for inserting said electrical contacts into said apertures.

2. In the method of making an electrical connector having a plurality of electrical contacts therein, the steps comprising: feeding a plurality of said electrical contacts, in a linear array, from a supply thereof to a first work station; engaging a clamp at said first work station to engage said plurality of contacts; moving said clamp in a +Y direction by actuating first means; transferring said clamped array of contacts to a second work station by actuating a second motor means to move said clamp in a +Z direction; providing a connector body at said second work station, said connector body having a plurality of contact receiving apertures therein; depositing said contacts into said apertures by moving said clamp in a −Y direction by again actuating said first motor means; releasing said clamp; and returning said clamp to said first work station.

* * * * *